United States Patent
Peters

(10) Patent No.: US 8,214,265 B2
(45) Date of Patent: Jul. 3, 2012

(54) INDIRECT CUSTOMER IDENTIFICATION SYSTEM AND METHOD

(75) Inventor: David W. Peters, Minneapolis, MN (US)

(73) Assignee: BBY Solutions, Inc., Richfield, MN (US)

( * ) Notice: Subject to any disclaimer, the term of this patent is extended or adjusted under 35 U.S.C. 154(b) by 887 days.

(21) Appl. No.: 11/215,693

(22) Filed: Aug. 30, 2005

(65) Prior Publication Data

US 2006/0065716 A1 Mar. 30, 2006

Related U.S. Application Data

(60) Provisional application No. 60/657,255, filed on Feb. 23, 2005, provisional application No. 60/606,343, filed on Aug. 31, 2004.

(51) Int. Cl.
*G06Q 10/00* (2006.01)
(52) U.S. Cl. .......................................... 705/28
(58) Field of Classification Search ............ 705/28, 705/26; 707/101
See application file for complete search history.

(56) References Cited

U.S. PATENT DOCUMENTS

| | | | | |
|---|---|---|---|---|
| 6,912,540 | B2 * | 6/2005 | Kohut et al. | 707/101 |
| 7,251,625 | B2 * | 7/2007 | Anglum | 705/35 |
| 7,283,974 | B2 * | 10/2007 | Katz et al. | 705/26 |
| 2003/0055707 | A1 * | 3/2003 | Busche et al. | 705/26 |
| 2003/0065595 | A1 * | 4/2003 | Anglum | 705/35 |
| 2003/0183689 | A1 * | 10/2003 | Swift et al. | 235/380 |
| 2007/0185821 | A1 * | 8/2007 | Wells et al. | 705/67 |

OTHER PUBLICATIONS

Provident Betting on Visa's Entry in POS Check Race.(Provident Bank to offer point of sale electronic transactions), Wade, Will; American Banker, 167, 249, 12, Dec. 31, 2002.*

* cited by examiner

*Primary Examiner* — Matthew S. Gart
*Assistant Examiner* — R. Shay Glass
(74) *Attorney, Agent, or Firm* — Beck & Tysver PLLC

(57) ABSTRACT

A database system and method is presented that updates a retail transaction database for each transaction by extracting a name from a payment mechanism. Associations already made between the customer records, the transactions database, and the payment account database are used in conjunction with the extracted name to create additional associations between customers and transactions and between customers and payment accounts. In addition, new customer records can be created by searching demographic databases using the reverse append name and data associated with the transaction already in the database.

27 Claims, 6 Drawing Sheets

INDIRECT CUSTOMER IDENTIFICATION SYSTEM AND METHOD

PRIORITY

This application claims the benefit of U.S. Provisional Application No. 60/657,255, filed Feb. 23, 2005, and also claims the benefit of U.S. Provisional Application No. 60/606,343, filed Aug. 31, 2004.

FIELD OF THE INVENTION

The present invention relates to a method for indirectly identifying a customer. More specifically, the present invention uses a name taken from a payment mechanism to assign a customer record in a database to a sales transaction or an account record.

BACKGROUND OF THE INVENTION

In a retail environment, it is important to be able to associate a customer with each transaction. Customer identification helps in analyzing customer purchase patterns, which improves the product selection and marketing of the retail organization.

One traditional method of customer identification is to simply ask the customer to identify him or herself at the time of the transaction. For example, a store employee might ask for the customer's phone number at the point of sale. The phone number is then entered into a computer system, and a customer database record that matches the phone number is presented to the sales associate. Optionally, the customer may be asked to verify that the information in the customer record is correct. If there is no match between the given phone number and any record in the customer database, or if the customer indicates that the database record contains inaccurate or outdated information, the customer is asked to provide detailed information for inputting directly into the customer database.

Three major problems exist with this type of customer identification. First, the customer may object to giving personal information at the time of a purchase transaction. Such questions often feel invasive, and can lead the customer to associate this negative feeling with shopping at the retail store. Second, the customer may provide inaccurate information, such as an outdated or incorrect phone number. Unless the customer is then asked to verify the information found in the customer database, bad data will be stored in the database leading to an inaccurate analysis at a later date. Finally, directly requesting a name or phone number from each customer slows down all transactions at the point of sale. This may lead to customers experiencing a longer wait to purchase their items, leading once again to negative associations with the store. Alternatively, additional staff will be required at check out to compensate for the additional time necessary for each transaction, increasing the retailers cost per sales transaction.

Another approach to identifying a customer is to institute a customer loyalty program. In these programs, the customer is asked to provide personal information, such as their name, address, and phone number. The information is entered into a customer database, and associated with a customer identification number. This number is placed on a loyalty card that is given to the customer. Rewards are then given to the customer for using the card during future payment transactions. Such rewards can include discount prices, or an accumulation of "points" that can be redeemed for products, discounts, or cash at a later date. When the customer loyalty card is presented during a sales transaction, the sales associate can quickly read the customer identification number from the loyalty card, thereby positively identifying the customer for that transaction. Unfortunately, many customers decline to use loyalty cards, meaning that this technique standing alone is not adequate to meet the customer identification needs of all retailers.

A third approach to customer identification utilizes the credit card number that is used by a customer to make a purchase. This technique records the credit card number and later submits the recorded numbers to a third party, who then returns information about the individual or individuals who are authorized to use each card number. This technique was highly effective for identifying customers for credit card transactions, although it was usually impossible to distinguish between two different individuals who are authorized to use the same credit card account. However, recent statutory changes in the United States have prevented any further use of this technique.

The above-described identification techniques can be considered different methods of "direct identification," since the customer directly identifies themselves at the sales transaction (either verbally or by presenting a customer loyalty card with a customer number or a credit card with a credit card number). Because of the problems associated with these techniques, many retail chains are pursuing alternative methods of customer identification. Some of these methods do not involve any "direct" identification, but instead "indirectly" identify the customer by making an educated guess as to the customer's identify based upon the details of the transaction.

The assignee of the present invention has developed a technique described in U.S. patent application Ser. No. 09/970,236, filed Oct. 2, 2001 and entitled Customer Identification System and Method, which is hereby incorporated by reference. This technique uses the name of a customer as taken from a payment mechanism (such as a credit card) to make an educated guess as to the consumer's identity. This name, sometimes called a "reverse-append" name, or "RAN," may be shared with hundreds or thousands of other individuals. Hence, obtaining the customer's name is not a direct identification method. The technique in application Ser. No. 09/970,236 compares the name with individuals within a "trade area" associated with the store. When multiple individuals are found, a scoring system is used to select the best match, which is the individual most likely to be the customer in that particular transaction. While this approach is useful in identifying customers, more techniques are needed to identify customers, especially when customer related data is already available to the retailer for a particular transaction.

SUMMARY OF THE INVENTION

The foregoing needs are met by the present invention, which provides for a system and method of automatically updating a retailer's transaction database based on transaction performed at a point of sale terminal. The present invention extracts a reverse append name from a payment mechanism. This name is then used to assign customers in the customer database to transaction records and account records. If the reverse append name matches the name of a customer already associated with the transaction, then that customer will be associated with the utilized payment account. In addition, if the extracted name matches a customer already associated with the payment account, that customer will be associated with the transaction.

If the name does not match any customer already associated with the transaction or payment account, then one of two sub-processes will be performed. The first is performed if other customers are already associated with the transaction. This sub-process searches the customer database and a demographic database for individuals that share a phone number or address with one of the customers already associated with the transaction. If such individuals are found, their name is compared with the reverse append name. If a match is made, that individual is entered into the customer database, and associated with both the payment account and the transaction.

If no such match is made, or if there are no individuals associated with the payment account, then the second sub-process is performed. This sub-process searches for individuals who reside in the trade area associated with the retail store in which the transaction took place. Those individuals are then compared with the reverse append name. If a single match is found, then that individual is added to the customer database and associated with the payment account and the transaction.

If a single match is not found, a different sub-process is performed. This sub-process determines if any customers in the customer database have been already associated with the transaction as a result of direct identification (or other association created resulting in a high degree of confidence). If so, that customer is associated with the payment mechanism. This last sub-process is also performed when no reverse append name could be extracted from the payment mechanism.

DETAILED DESCRIPTION OF THE INVENTION

Database 10

Figure 1:
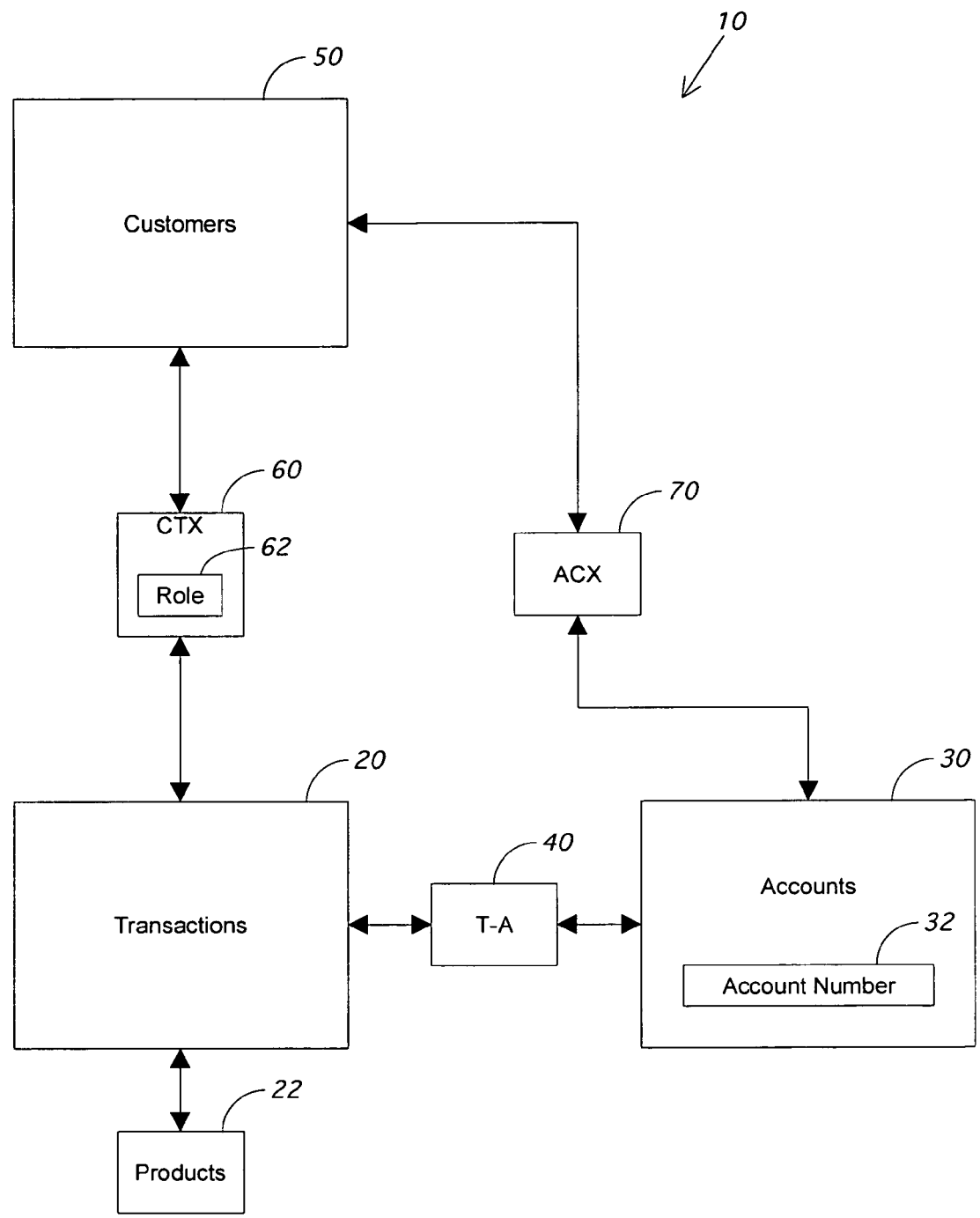
FIG. 1 is a block diagram of the database used by the present invention.

The present invention uses the database 10 of FIG. 1 to record information about sales transactions, customers, and payment accounts. When a purchase transaction takes place, information about the transaction is stored in the transaction database 20. This information may include a listing of the items purchased 22, as well as the date, time, and location of the transaction.

Information about the payment mechanism used is stored in the accounts database 30. Example payment mechanisms include credit cards, debit cards, checking accounts, gift cards, and gift certificates. Although statutory changes in the United States prevent credit card numbers taken at a point of sale from being submitted to a third party for customer identification, it is still permissible for retailers to record credit card numbers and associate those numbers with a particular sales transaction. Thus, the records in the accounts database 30 will include information about the payment mechanism, including the account number 32 or other payment identifier. An indication that a particular payment mechanism was used in a particular transaction is stored in a link 40 between the transaction table 20 and the accounts table 30. In this case, the link record 40 is called a T-A link, indicating a link between a transaction 20 and an account 30. One account 30 might be associated with multiple transactions 20 (multiple purchases made using the same credit card), and vice versa (multiple payment mechanisms used to pay for a single transaction).

Information about a retailer's customers can be stored in customer database 50. This database will normally include identifying information such as name, address, and phone number and may include other information such as family size or estimated income.

One of the primary goals of maintaining this database 10 is to create an association between each transaction 20 and a customer in the customer database 50. This association is maintained as a CTX link record 60, which links one customer 50 with one transaction 20. A customer 50 who has made multiple purchases from the retailer would have multiple CTX records 60 linking to multiple entries in the transactions database 20. In the preferred embodiment, it is also possible to link multiple customers 50 with a single transaction 20. This might occur when multiple services are purchased at a single time for separate individuals, such as when a parent purchases separate gift or loyalty cards for two different children. Each child would be considered a customer for that transaction, as would the parent. Differences between these customers-to-transaction links 60 can be tracked within the CTX link database 60 through the use of a "role" field 62. The link 60 to the customer records 50 of the children might have a value of "Gift Card Owner" in the role field 62, while the link 60 for the parent might have a role indicating that they purchased the gift cards.

The records in the customer database 50 can also be associated with payment accounts in the account database 30 through an ACX link record 70. These links 70 can also be multiple-to-multiple links, meaning that each record in the customer database 50 can be associated with multiple payment accounts 30, and multiple customers 50 can be associated with a single payment account 30.

System 80

The heart of the present invention is a system 80 that automatically updates and enhances the data in database 10 for each transaction. The system 80 includes one or more point of sale terminals 82 that receive information about each transaction, including the products 22 purchased during the transaction. The terminals 82 also receive information about the payment mechanism 84 used to purchase the products 22. The payment mechanism 84 is often a credit card, a debit card, or a gift/stored value card that is associated with an account number 32. The point of sale terminals 82 in the present invention is often able to extract the name 86 of an individual from the payment mechanism 84. This is typically done using the same mechanism that is used to obtain the account number 32. For example, most credit cards use a magnetic strip that is encoded with both the credit card account number 32 and the name 86 of the credit card holder as it appears on the front of the card. The encoded name 86 on the payment mechanism is sometimes referred to as the "reverse-append name" or "RAN."

Information about each transaction, including the products 22 purchased, the account number 32 of the payment mechanism 84, and the name 86 extracted from the payment mechanism 84 (if any) are forwarded from the point of sale terminal 82 to a central computer 90. Additional information related to the transaction may also be submitted. For instance, some services, such as a product service plan or a cell phone subscription, require that the customer supply their name and address. This additional customer information 88 will be submitted along with the transaction information to the central computer 90.

The central computer 90 might be an individual mainframe-class computer, a server-class computer, or a collection of mainframe and/or server computers, all running standard operating systems. On this central computer 90 is a database system 10 as described in connection with FIG. 1. This database system 10 might be a relational database management system, an object-oriented database, or any other database system capable of storing and processing large amounts of transaction related data for a retail enterprise. The retailer may choose to centrally locate a single computer system 90 and have it manage all data throughout a worldwide enterprise. Alternatively, the retailer may choose to have multiple central computer systems 90 that simultaneously process data for the enterprise.

The central computer 90 can receive the data directly from the one or more point of sale terminals 82, or indirectly via one or more intermediate computing systems. Information related to every sales transaction is transmitted to the central computer 90, either immediately after the transaction is completed or at a later time. When the central computer 90 receives the data, the database 10 establishes a new record in the transactions database 20 indicating the products 22 purchased and the date, time, and location of the transaction. The account number 32 is then used to search the accounts database 30. If there is no record of that account number 32, a new record is added to the accounts database 32, and a T-A linkage record 40 is used to link the transaction record 20 to the new account record 30. If a record in database 30 is found to match the account number 32, a T-A record 40 links the transaction to the found record. If multiple accounts 30 were used in a transaction 20, T-A records 40 will be created for each account 30. In some circumstances, such as a cash transaction, no account information will be transmitted to the central computer. In these circumstances, no T-A record 40 will be created.

The central computer 90 also receives the additional customer information 88 from the point of sale terminals 82, such as the name and address of a cell-phone subscriber. This information is added to the customer database 50, with a CTX link 60 with the transaction. The CTX link 60 will have a role value 62 that reflects the nature of the relationship between the customer 50 and the transaction 20. Example role values 62 for customer records 50 created from the additional customer information 88 include cell phone subscriber, extended warranty owner, or loyalty card subscriber.

The central computer 90 can also create CTX 60 relationships between existing customers 50 and the new transaction 20 by examining the accounts 30 used to pay for the transaction 20. All accounts 30 associated with the transaction 20 through a T-A record 40 are examined by the computer 90 for ACX records 70. These ACX records 70 identify customers 50 that have been previously associated with the account 30 in database 10. These customers 50 can then be associated with the transaction 20 through the creation of a new CTX link 60. It is quite possible that multiple CTX links 60 will be created through this process for a single transaction 20, such as when multiple family members are authorized to use the same credit card. Thus, the role value 62 for the CTX links will not be particularly strong, indicating that this is a possible customer 50 for this transaction 20 but not necessarily the actual person who was in the store doing the purchasing.

The present invention then applies the unique algorithm described below to establish relationships between records in the customer database 50 and the transaction 20 and account records 30. In performing this algorithm, the central computer 90 may access a demographic database 95 which may be located on the central computer 90 or may be hosted by a third party. This demographic database 95 contains information about individuals residing in a particular geographic area, such as North America. In most circumstances, the demographic database 95 will contain the names, addresses, and phone numbers of a large percentage of the people residing in the geographic area.

Process 100

Figure 3:
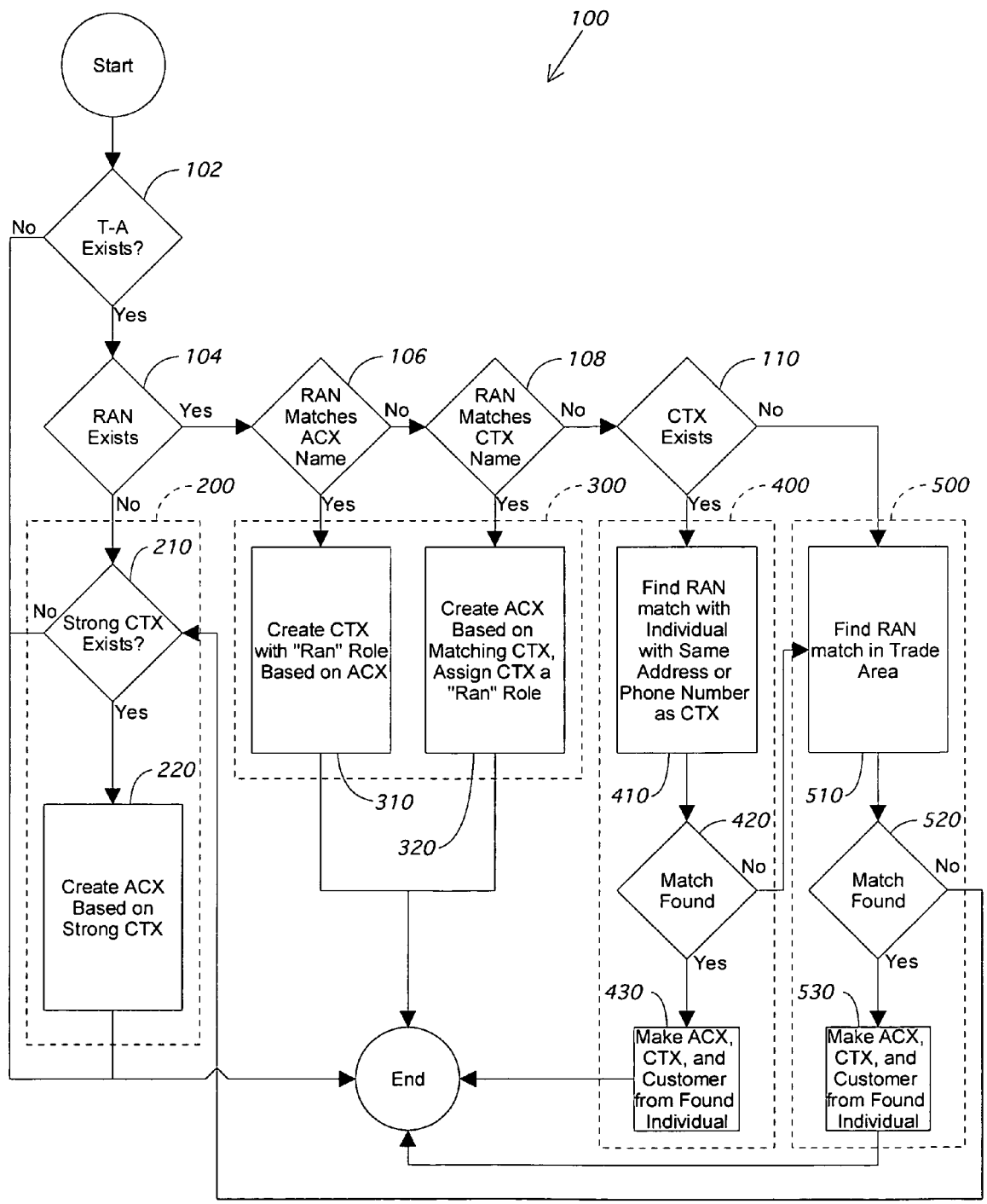
FIG. 3 is a flow chart of a first embodiment process used to update the database of FIG. 1.

One embodiment of the algorithm 100 used to update relationships in database 10 is set forth in the flow chart of FIG. 3. This process occurs for each transaction 20, and is performed after the transaction, account, and customer databases 20, 30, 50 are updated with the basic information received from the point of sale terminals 82.

Start: Ensure T-A Record Exists

The process 100 starts at step 102, which determines whether a T-A record 40 links this transaction 20 with an account 30. Since the algorithm 100 works only where a transaction 20 is clearly linked to an account 30 through a T-A link record 40, the absence of T-A record 40 for a transaction 20 causes the process 100 to terminate. A transaction 20 without a T-A record 40 is likely to be a cash-based transaction, without any account information or a reverse-append name. In these circumstances, there is little that can be accomplished by the present algorithm 100.

Sub-Process 200

Figure 4:
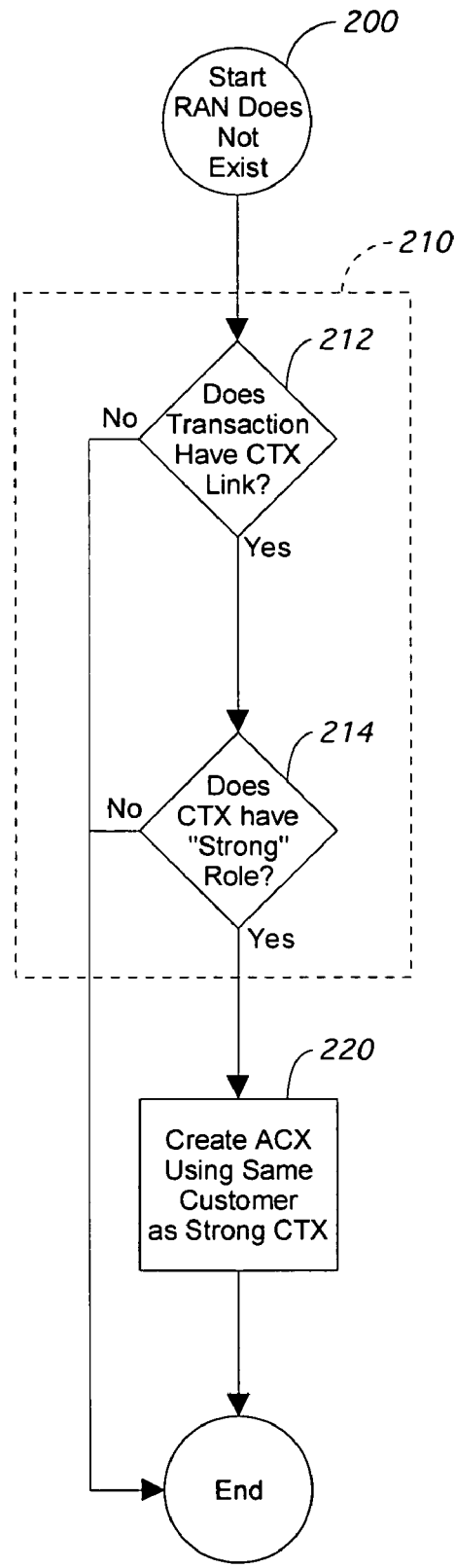
FIG. 4 is a flow chart of a sub-process used by the process of FIG. 3.

Assuming a T-A link record 40 does exist, the algorithm then determines whether a reverse-append name 86 was extracted from the payment mechanism 84. If no name 86 exists, then the algorithm 100 executes sub-process 200, which is shown in FIG. 3 and in more detail in FIG. 4.

Figure 2:
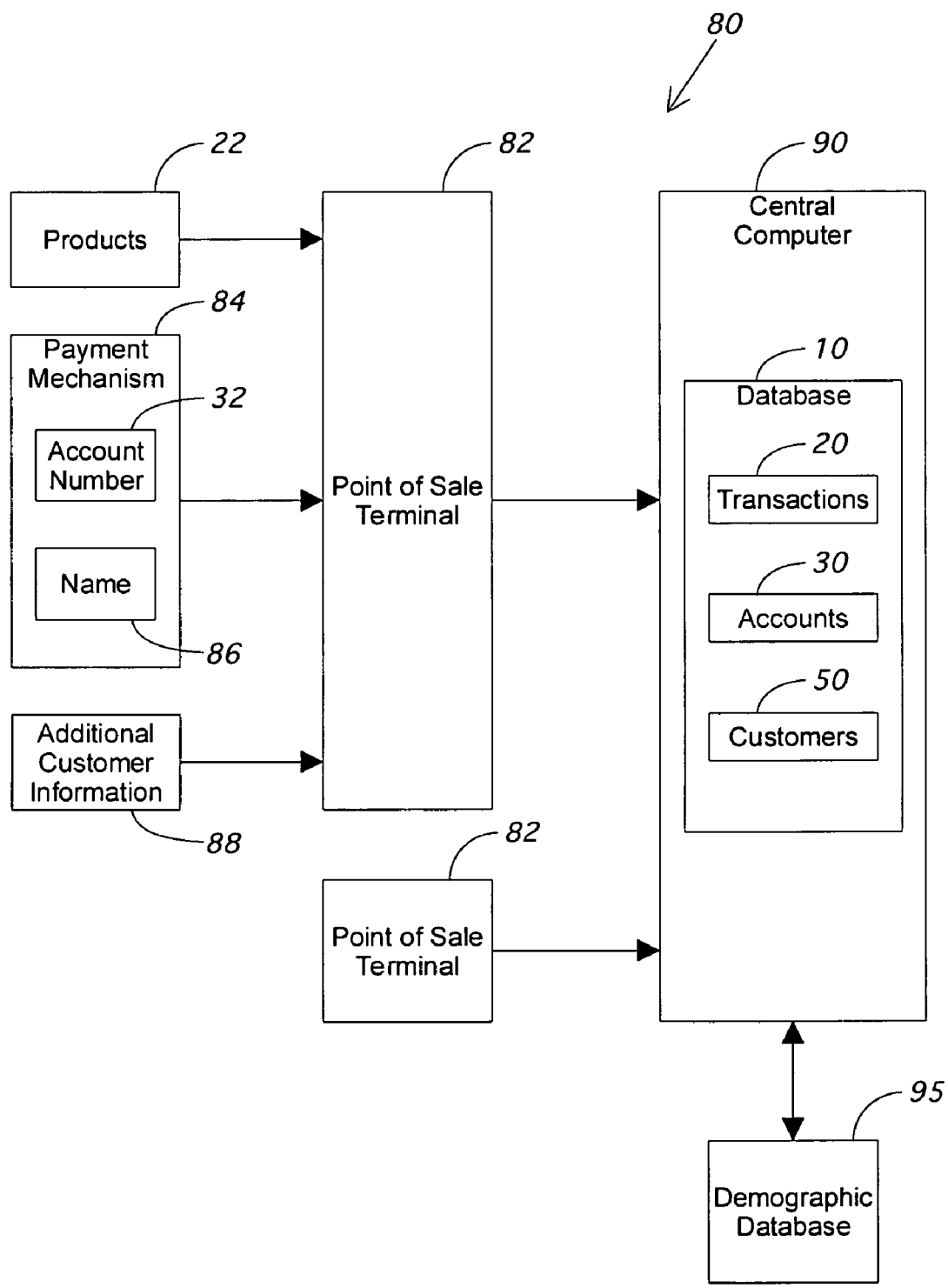
FIG. 2 is a block diagram of the system components used by the present invention.

Without a customer name, this sub-process 200 is not able to identify a customer 50 for a transaction 20. Instead, this sub-process 200 attempts to see if it can create a link between the payment account 30 used for the transaction 20 and a customer 50 already associated with the transaction 20. To do this, the sub-process 200 checks to see if a customer 50 has already been assigned to the transaction 20 through a CTX link record 60. These relationships might have been established prior to this algorithm 100 through some type of direct identification of the customer shown as additional customer information 88 on FIG. 2. For instance, the customer may have purchased an extended warranty or service plan as part of the transaction, where the customer was required to give a name and address as part of the purchase process. When this information is forwarded to the central computer 90, the data is automatically entered into the customer database 50, and a CTX link 60 is established. The role field 62 of the CTX link 60 will indicate how the customer has been associated with the transaction, such as through a product service plan. Hence, at step 212, sub-process 200 checks for the existence of any CTX links 60 for this transaction 20. Step 214 then determines if the role 62 is "strong" enough. In other words, step 214 determines whether the origin of the link 60 gives the association between the customer 50 and the transaction 20 a high degree of confidence. One test would be whether the role 62 indicates that the customer directly identified himself or herself during the transaction. If both step 212 and 214 are answered affirmatively (which are combined into a single step 210 in the higher level flow chart of FIG. 3), then step 220 will create an ACX link 70 between the customer 50 and the payment account 30 used in that transaction. Of course, it is possible that an ACX link 70 already exists between this customer 50 and the account 30. In this case, no additional ACX record 70 will be created.

Sub-Process 300

If step 104 determines that a name 86 was extracted from the payment mechanism 84, then step 106 determines whether this name 86 matches the name of any customers 50 that are already associated with the account 30 used during the transaction 20. This would be the case if an account 30 had already been used at the retail enterprise and had previously been linked to the customers 70. A successful name match at step 106 means that a particular customer 50 has been uniquely associated with the transaction. Sub-process 300, at step 310, then creates a CTX link record 60 between that customer 50 and the current transaction 20. The CTX record 60 is created with a role field 62 of "RAN," indicating a strong degree of confidence in this relationship since it was based on the customer name 86 extracted from the payment mechanism.

If step 106 does not find a match, step 108 determines whether the RAN 86 matches the name of any customer 50 already associated with the transaction 20, such as through additional customer information 88. This previous association would be made via the CTX records 60, hence it is the customers 50 linked through the CTX records 60 that are examined in this step 108. If a match is found, there is a great deal of confidence that this customer 50 is the primary customer for the transaction 20 as well as one of the authorized customers for the account 30. Thus, sub-process 300 will, at step 320, create the CTX 60 and ACX 70 records to show this association. A new CTX record 60 with a "RAN" value in role field 62 will be created even though another CTX record 60 with a different role value already exists between the same transaction 20 and customer 50. This is the case because customers can have different roles with the same transaction (i.e., the customer is both the contact person for a product service plan and the purchaser of the plan).

The above description separates steps 106 and 108 into two separate comparisons, each executing slightly different steps 310, 320. However, it is quite possible to combine these into a single comparison and step. If the central computer 90 has previously created CTX links 60 for all customers 50 identified through ACX links 70 with accounts 30 associated with the transaction 20, then there would be no need to separately perform comparison 106. All matches to this step 106 will have already been associated with the transaction through a CTX link 60, and therefore would be discovered in step 108. Thus, step 106 and 310 could be eliminated from process 100. Step 320 would then create an additional ACX link 70 between the customer 50 and the account 30 only if the ACX link 70 did not already exist.

Sub-Process 400

If the RAN 86 does not match the name of any customer 50 already identified with the transaction 20, then step 110 will determine whether any customer 50 has been associated with the transaction 20 (i.e., customers 50 whose name does not match the RAN 86). This is accomplished simply by determining whether any CTX records 60 exist for the transaction 20. If so, then sub-process 400 is executed, otherwise sub-process 500 is executed.

The goal of sub-process 400 is to use address and phone number information that is known about the customers 50 already associated with the transaction 20 to find or create a customer record 50 that matches the reverse append name 86. The first step 410 is to search all customer records 50 in database 10 for individuals that share the same address or phone number with the customers 50 already associated with the transaction 20. If so, the found customer records 50 are examined at step 420 to see if the names in the found customer records 50 match the reverse append name 86. If so, step 430 creates the proper CTX 60 and ACX links 70. If not, the sub-process 400 can repeat the search using demographic database 95. If there is no match in the demographic database 95, sub-process 500 is called.

Figure 5:
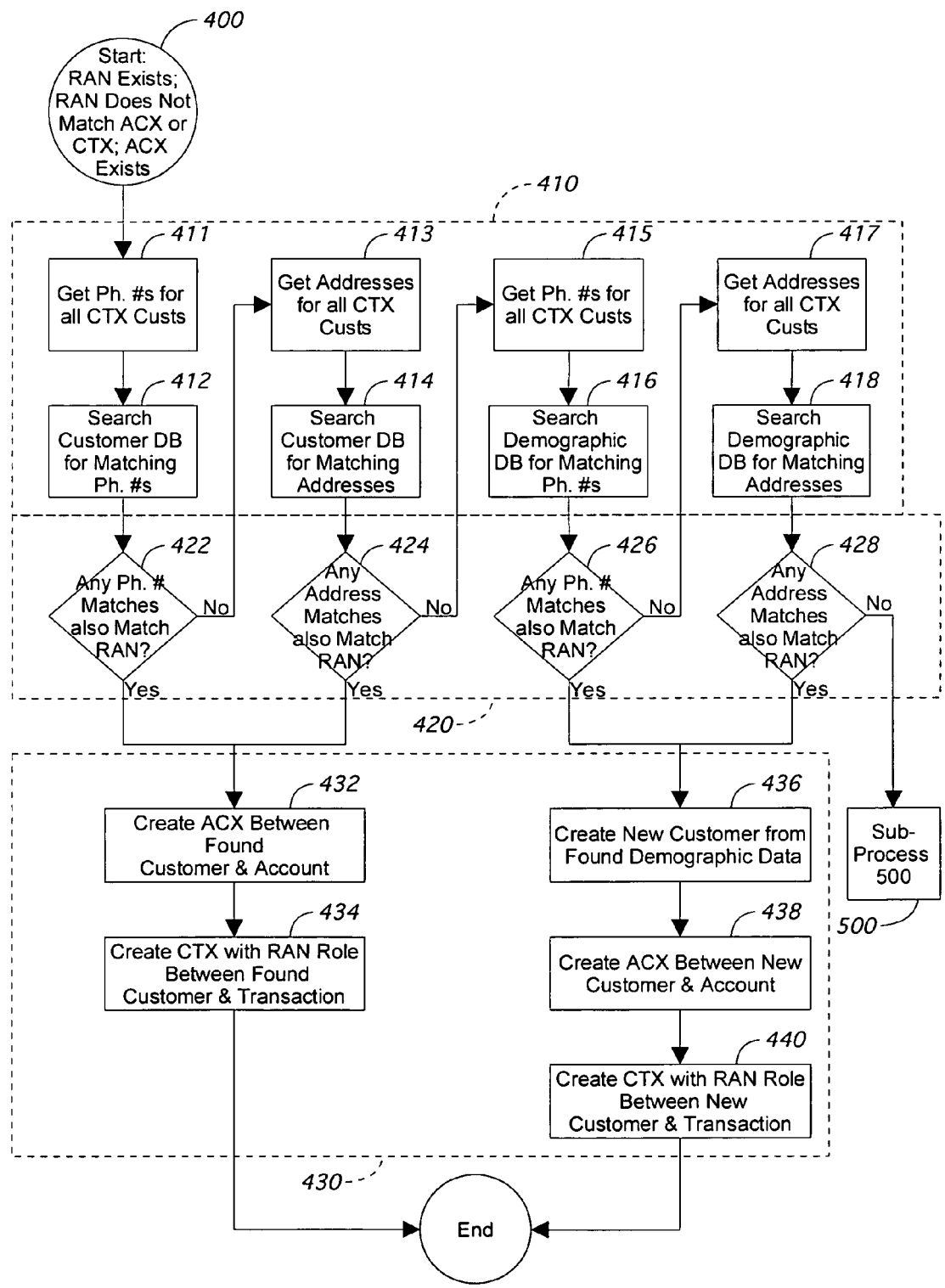
FIG. 5 is a flow chart of a sub-process used by the process of FIG. 3.

The details of sub-process 400 are shown in FIG. 5. In this figure, step 410 is divided into four separate searches (each consisting of two steps), while step 420 is divided into four separate comparisons. In steps 411 and 412, the Customer database 50 is searched for phone numbers that match the phone numbers of existing CTX-related customers, and step 422 determines if any of those matches have substantially the same name as reverse-append name 86. Steps 413, 414, and 424 search the customer database 50 for customers that share an address with an existing CTX-related customer and have a name similar to RAN 86. Steps 415-418 are much like steps 411-414, except that demographic database 95 is searched instead of the existing customer database 50. Like steps 422 and 424, steps 426 and 428 determine if the search of demographic database 95 found any individuals having a name substantially similar to the name 86 extracted from the payment mechanism 84. If none of the comparison steps 422-428 find a match, sub-process 400 terminates by calling sub-process 500.

If either step 422 or 424 has discovered a match in the customer database 50, it is necessary to update database 10. Step 432 creates an ACX link record 70 between the found customer record 50 and the payment account 30 used in the transaction 20. Similarly, step 434 creates a CTX record 60 (with a RAN role 62) between the found customer record 50 and the current transaction record 20.

If a match is discovered in the demographic database 95 in steps 426 or 428, it is also necessary to update the database 10. In this case, however, there is no record in the customer database 50 containing the matched data. Hence, a new record must be created in this database 50 to reflect the information found in the demographic database 95. This occurs in step 436. Steps 438 and 440 then create the ACX 70 and CTX 60 link records to this new Customer record 50, just as was done in steps 432 and 434.

Sub-Process 500

Sub-process 500 attempts to identify a customer 50 when no CTX records 60 are found at step 110, or when process 400 fails to identify a customer 50 with a name similar to the RAN 86. This sub-process 500 is similar to the procedure that is described in incorporated patent application Ser. No. 09/970, 236. A database, which can be the existing customer database 50, a demographic database 95, or both, is searched for any record having a name similar to the reverse append name 86. These records must also have an address (whether it be a home address, a work address, or other) within the geographic trade area of the retail store where the transaction 20 took place. The trade area is defined by the geographic region where customers of the retail store typical reside, based upon an analysis of the residences of actual historical customers of the store.

Figure 6:
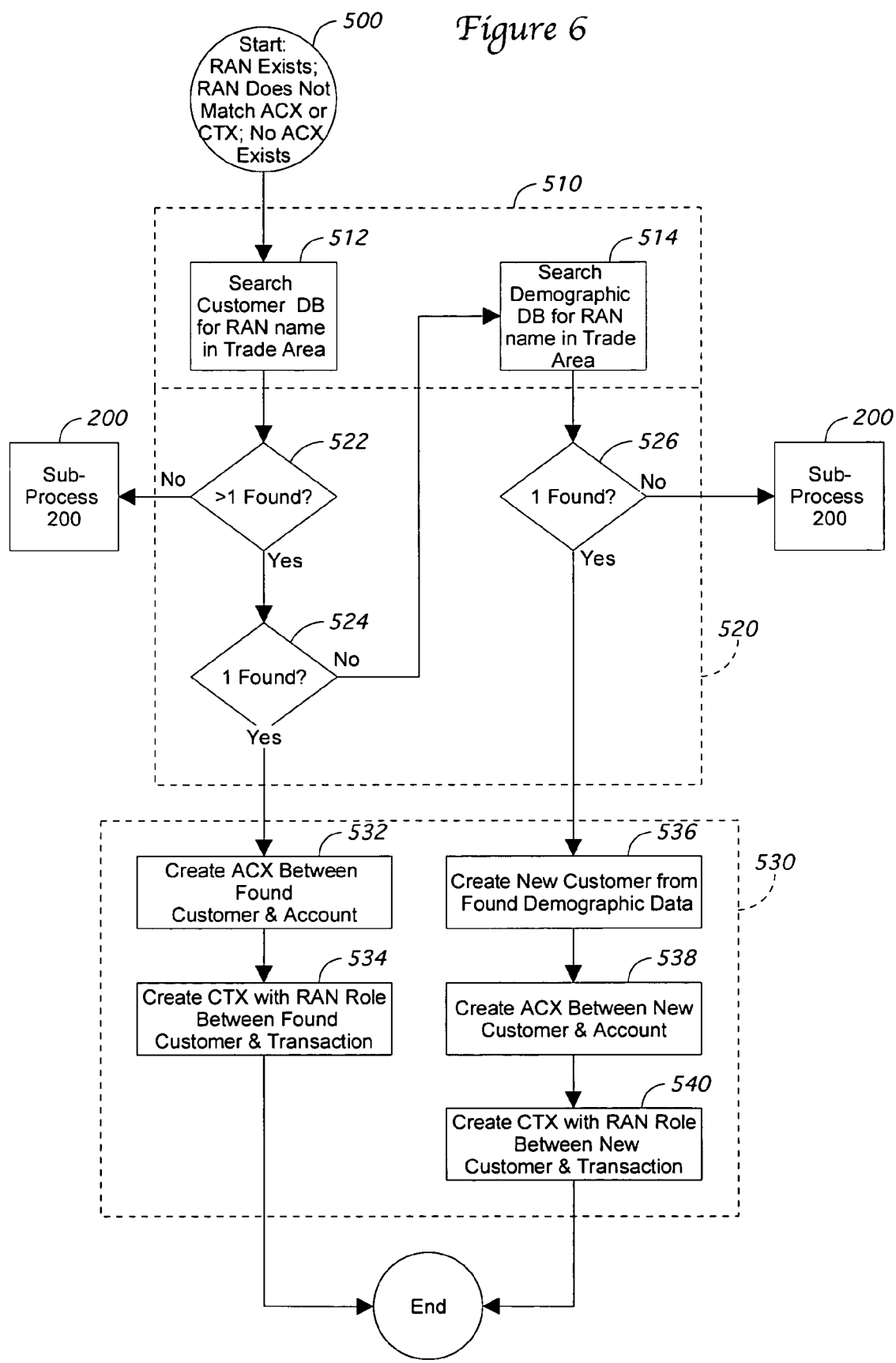
FIG. 6 is a flow chart of a sub-process used by the process of FIG. 3.

In the preferred embodiment shown in FIG. 6, the customer database 50 is first searched at step 512. If steps 522 and 524 indicate that a single customer has been found within the trade area having a name similar to the reverse append name 86, then steps 532 and 534 create an ACX record 70 and a CTX record 60 to associate the customer 50 with the relevant account 30 and transaction 20. If step 522 indicates that more than one customer is located in the search, sub-process 500 ends unsuccessfully and sub-process 200 is executed. If step 524 indicates that no matches were found by searching the customer database 50, the demographic database 95 is searched in step 514. If step 526 indicates that a single individual was found in this search, then a customer record 50 is created in step 536 using the data for that individual from the demographic database 95. An ACX 70 and a CTX 60 record are then created for this newly created customer record 50 in steps 538 and 540. If step 526 indicates that no matches are found, or if more than one individual matches the search, sub-process 500 ends unsuccessfully by reverting back to sub-process 200. The return to sub-process 200 indicates that sub-processes 300, 400, and 500 were unable to augment the database 10 using the reverse-append name 86 extracted from the payment mechanism 84. Consequently, sub-process 200, which does not require the existence of a RAN 86, is executed to see if an ACX record 70 can be created based on the presence of a CTX record 60 with a "strong" role 62.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system for automatically updating entries in a database based upon information received from a plurality of point of sale terminals comprising:
   a) a central computer system;
   b) a computerized database system residing on the central computer system, the database system having
      i) a transaction database containing a plurality of transaction records,
      ii) an accounts database containing a plurality of account records,
      iii) a customer database containing a plurality of customer records each containing a customer name field,
      iv) a T-A link database containing links between the transaction and the account records,
      v) an ACX link database containing links between the customer and the account records, and
      vi) a CTX link database containing links between the customer and the transaction records;
   c) a communication link linking the central computer system to the plurality of point of sale terminals;
   d) a new transaction information record received by the central computer system over the communication mechanism concerning a new transaction, the new transaction information record containing
      i) sales information including a list of products purchased during the transaction;
      ii) account information about a transaction account used to purchase the list of products, and
      iii) a transaction customer name taken from a payment mechanism during the new transaction;
   e) basic programming on the central computer system for receiving the new transaction information record and updating the computerized database system by
      i) creating a new transaction record in the transaction database based upon the sales information;
      ii) determining if a transaction account record exists in the accounts database that matches the transaction account and creating the transaction account record in the account database if the transaction account record does not already exist;
      iii) creating a new T-A link between the new transaction record and the transaction account record; and
   f) advanced programming on the central computer for
      i) determining whether any account customers exist for the transaction account record by finding any ACX links between the transaction account record and the customer records;
      ii) determining whether the transaction customer name matches the customer name field in any of the account customers; and
      iii) if a match is found, creating a new CTX link between the matching account customer and the new transaction record.

2. The system of claim 1, wherein the new CTX link has a role value reflecting the matching customer names.

3. The system of claim 2, wherein the advanced programming further creates another new CTX link having a second role value between each of the account customers and the new transaction record.

4. The system of claim 1, wherein the new transaction information record further includes additional customer information provided directly by a customer including a customer address, and further wherein the basic programming further updates the computerized database system by:
   iv) determining whether any existing customer records contain the customer address,
   v) if there is no match, creating a new customer record containing the customer address, and
   vi) creating a new CTX link record between the customer record containing the customer address and the new transaction record.

5. The system of claim 4, wherein the advanced programming also updates the computerized database system by:
   iv) determining whether any customer records currently linked to the new transaction record through the CTX records contain a matching customer name that matches the transaction customer name,
   if there is a match, creating an additional CTX link record from the matching customer record and the new transaction record, the additional CTX link record having a role value indicating that the matching customer record has a customer name field matching the transaction customer name.

6. The system of claim 1, further comprising:
   g) additional programming to update the computerized database system by:
      i) determining whether any customer records currently linked to the new transaction record through the CTX records contain a matching customer name that matches the transaction customer name,
      ii) if there is a match, creating an additional CTX link record from the matching customer record and the new transaction record, the additional CTX link record having a role value indicating that the matching customer record has a customer name field matching the transaction customer name,
      iii) if there is no match, creating a first list of additional identifying information from all of the customer records currently linked to the new transaction record, the additional identifying information chosen from a set including a phone number and a street address,
      iv) searching customer records in the customer database for a matching customer record having a customer name field value similar to the transaction customer name and identifying information that matches one or more of the additional identifying information in the first list;
      v) creating a new CTX link between the matching customer record and the new transaction record.

7. The system of claim 6, wherein the additional programming further comprises the step of examining a demographic database for individuals having a similar name to the transaction customer name; and further wherein the step of creating a new CTX link between the matching customer record and the new transaction record further comprises the step of creating the matching customer record from information obtained from the demographic database.

8. A method for updating an electronic database on a computerized system comprising:
  a) establishing the database with customer records, account records, and transaction records, the database also having link databases containing T-A links between the transaction records and the account records, ACX links between the customer records and the account records, and CTX links between the customer records and the transaction records,
  b) receiving a particular name extracted from a payment mechanism used in a purchase transaction;
  c) identifying a purchase transaction record in the database for the purchase transaction indicating items purchased in the purchase transaction;
  d) finding a matching account record in the database for the payment mechanism;
  e) finding transaction customer records associated with the identified purchase transaction record using CTX links within the database between the customer records and the transaction records in the database;
  f) extracting identifying information from the found transaction customer records, wherein the identifying information is selected from a group comprising phone number information and address information;
  g) searching for additional customer records having the same identifying information as at least some of the extracted identifying information;
  h) finding a selected customer record from the additional customer records by comparing names found in the additional customer records with the particular name extracted from the payment mechanism; and
  i) associating the selected customer record with the identified purchase transaction record by creating a new CTX link in the database between the selected customer record and the identified purchase transaction record.

9. The method of claim 8, further comprising:
  j) associating the selected customer record with the matching account record by creating a new ACX link in the database between the selected customer record and the matching account record.

10. The method of claim 8, further comprising:
  j) searching for matching individuals in a demographic database having at least some of the same identifying information as the extracted identifying information, the demographic database including information about individuals that are not associated with the customer records in the database;
  k) finding a selected individual from the matching individuals by comparing names found in the demographic database with the particular name extracted from the payment mechanism, and
  l) creating a new customer record in the database based upon information in the demographic database regarding the selected individual.

11. The method of claim 10, further comprising:
  m) associating the new customer record with the identified purchase transaction record by creating a new CTX link in the database between the new customer record and the identified purchase transaction record.

12. The method of claim 11, further comprising:
  n) associating the new customer record with the matching account record by creating a new ACX link in the database between the new customer record and the matching account record.

13. The method of claim 8, wherein the step of finding a matching account record for the payment mechanism includes the step of creating the matching account record in the database for the payment mechanism if the matching account record does not already exist.

14. A system for updating a database having customer records, account records, and transaction records, the database also having link databases containing T-A links between the transaction records and the account records, ACX links between the customer records and the account records, and CTX links between the customer records and the transaction records, the system comprising:
  a) means for receiving a particular name extracted from a payment mechanism used in a purchase transaction;
  b) means for identifying a purchase transaction record in the database for the purchase transaction indicating items purchased in the purchase transaction;
  c) means for finding a matching account record in the database for the payment mechanism;
  d) means for finding transaction customer records associated with the identified purchase transaction record using CTX links within the database between the customer records and the matching transaction records in the database;
  e) means for extracting identifying information from the found transaction customer records;
  f) means for searching for additional customer records having the same information as at least some of the extracted identifying information;
  g) means for finding a selected customer record from the additional customer records by comparing names found in the additional customer records with the particular name extracted from the payment mechanism; and
  h) means for associating the selected customer record with the identified purchase transaction record by creating a new CTX link in the database between the selected customer record and the identified purchase transaction record.

15. The system of claim 1, wherein the advanced programming also updates the computerized database system by:
  iv) determining whether any customer records currently linked to the new transaction record through the CTX records contain a matching customer name that matches the transaction customer name,
  v) if there is a match,
    (1) creating an additional CTX link record from the matching customer record and the new transaction record, the additional CTX link record having a role value indicating that the matching customer record has a customer name field matching the transaction customer name.

16. The system of claim 15, wherein step v) of the advanced programming further provides, if there is a match, creating an ACX link from the matching customer record and the transaction account record.

17. The system of claim 1, further comprising:
  g) additional programming to update the computerized database system by:
    i) creating a first list of additional identifying information from all of the customer records currently linked to the new transaction record, the additional identifying information chosen from a set including a phone number and a street address,
ii) searching for identities in at least one of the customer database and a demographic database, the identities having a customer name field value similar to the transaction customer name and identifying information that matches one or more of the additional identifying information in the first list;
iii) creating a new CTX link between the matching customer record and the new transaction record; and
iv) creating a new ACX link between the matching customer record and the account record associated with the new transaction record.

18. A method for updating an electronic database on a computerized system comprising:
a) establishing the electronic database on the computerized system with data records including customer records, account records, and transaction records, the database also having link records containing T-A links between the transaction records and the account records, ACX links between the customer records and the account records, and CTX links between the customer records and the transaction records;
b) electronically receiving transaction information from a point of sale device, the transaction information containing
i) sales information including a list of products purchased;
ii) account information about a transaction account used to purchase the list of products, and
iii) a transaction customer name taken from a payment mechanism;
c) creating a new transaction record in the transaction records based upon the sales information;
d) determining if a transaction account record exists in the account records that matches the transaction account and creating the transaction account record in the account records if the transaction account record does not already exist;
e) creating a new T-A link between the new transaction record and the transaction account record; and
f) determining whether any account customers exist for the transaction account record by finding any ACX links between the transaction account record and the customer records;
g) determining whether the transaction customer name matches a customer name field in any of the account customers; and
h) if a match is found, creating a new CTX link between the matching account customer and the new transaction record.

19. The method of claim 18, wherein the new CTX link has a role value reflecting the matching customer names.

20. The method of claim 19, further comprising the step of creating another new CTX link having a second role value between each of the account customers and the new transaction record.

21. The method of claim 18, wherein the received transaction information further includes additional customer information provided directly by a customer including a customer address, and further comprising:
i) determining whether any existing customer records contain the customer address,
j) if there are no existing customer records containing the customer address, creating a new customer record containing the customer address, and k) creating a new CTX link between the customer record containing the customer address and the new transaction record.

22. The method of claim 21, further comprising:
l) determining whether any customer records currently linked to the new transaction record through the CTX links contain a matching customer name that matches the transaction customer name,
if there is a match, creating an additional CTX link from the matching customer record and the new transaction record, the additional CTX link record having a role value indicating that the matching customer record has a customer name field matching the transaction customer name.

23. The method of claim 18, further comprising:
i) determining whether any customer records currently linked to the new transaction record through the CTX links contain a matching customer name that matches the transaction customer name,
i) if there is a match, creating an additional CTX link from the matching customer record and the new transaction record, the additional CTX link record having a role value indicating that the matching customer record has a customer name field matching the transaction customer name,
ii) if there is no match, creating a first list of additional identifying information from all of the customer records currently linked to the new transaction record through CTX links, the additional identifying information chosen from a set including a phone number and a street address;
j) searching customer records for a matching customer record having a customer name field value similar to the transaction customer name and identifying information that matches one or more of the additional identifying information in the first list;
k) creating a new CTX link between the matching customer record and the new transaction record.

24. The method of claim 23, further comprising the step of examining a demographic database for individuals having a similar name to the transaction customer name; and further wherein the step of creating a new CTX link between the matching customer record and the new transaction record further comprises the step of creating the matching customer record from information obtained from the demographic database.

25. The method of claim 18, further comprising:
i) determining whether any customer records currently linked to the new transaction record through the CTX links contain a matching customer name that matches the transaction customer name,
i) if any customer records currently linked to the new transaction record through the CTX links do contain a matching customer name that matches the transaction customer name, creating an additional CTX link from the matching customer record and the new transaction record, the additional CTX link having a role value indicating that the matching customer record has a customer name field matching the transaction customer name.

26. The method of claim 25, wherein if any customer records currently linked to the new transaction record through the CTX links do contain a matching customer name that matches the transaction customer name, creating an ACX link from the matching customer record and the transaction account record.

27. The method of claim 18, further comprising:
i) creating a first list of additional identifying information from all of the customer records currently linked to the new transaction record through CTX links, the additional identifying information chosen from a set including a phone number and a street address;
j) searching for matching identities in at least one of the customer database and a demographic database, the identities having a customer name field value similar to the transaction customer name and identifying information that matches one or more of the additional identifying information in the first list;
k) establishing a matching customer record for at least one of the matching identities discovered in the previous searching step;
l) creating a new CTX link between the matching customer record and the new transaction record; and
m) creating a new ACX link between the matching customer record and the account record associated with the new transaction record.

* * * * *

UNITED STATES PATENT AND TRADEMARK OFFICE
CERTIFICATE OF CORRECTION

| | | |
|---|---|---|
| PATENT NO. | : 8,214,265 B2 | Page 1 of 1 |
| APPLICATION NO. | : 11/215693 | |
| DATED | : July 3, 2012 | |
| INVENTOR(S) | : David W. Peters | |

It is certified that error appears in the above-identified patent and that said Letters Patent is hereby corrected as shown below:

Column 10, Line 36
In Claim 5, delete "if" and insert --v) if--, therefor.

Signed and Sealed this
Eighth Day of January, 2013

David J. Kappos
*Director of the United States Patent and Trademark Office*